(12) United States Patent
Kopec et al.

(10) Patent No.: US 8,239,657 B2
(45) Date of Patent: Aug. 7, 2012

(54) ADDRESS TRANSLATION METHOD AND APPARATUS

(75) Inventors: Brian Joseph Kopec, Cary, NC (US); Victor Roberts Augsburg, Cary, NC (US); James Norris Dieffenderfer, Apex, NC (US); Thomas Andrew Sartorius, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 661 days.

(21) Appl. No.: 11/672,066

(22) Filed: Feb. 7, 2007

(65) Prior Publication Data

US 2008/0189506 A1 Aug. 7, 2008

(51) Int. Cl.
*G06F 12/04* (2006.01)
(52) U.S. Cl. ............ 711/206; 711/201; 711/E12.059; 711/E12.061
(58) Field of Classification Search .......... 711/201
See application file for complete search history.

(56) References Cited

U.S. PATENT DOCUMENTS

| | | | | |
|---|---|---|---|---|
| 5,060,137 A | * | 10/1991 | Bryg et al. | 711/205 |
| 5,734,881 A | * | 3/1998 | White et al. | 712/238 |
| 5,765,022 A | * | 6/1998 | Kaiser et al. | 710/22 |
| 5,768,575 A | * | 6/1998 | McFarland et al. | 712/228 |
| 5,784,707 A | | 7/1998 | Khalidi et al. | |
| 6,378,058 B1 | * | 4/2002 | Furuhashi | 711/203 |
| 2006/0174066 A1 | * | 8/2006 | Bridges et al. | 711/125 |
| 2006/0248279 A1 | * | 11/2006 | Al-Sukhni et al. | 711/137 |

FOREIGN PATENT DOCUMENTS

| | | |
|---|---|---|
| EP | 0967553 | 12/1999 |
| RU | 2004123622 A | 3/2005 |
| TW | 200619934 | 6/2006 |
| TW | 200627270 | 8/2006 |
| WO | WO03058447 A2 | 7/2003 |

OTHER PUBLICATIONS

International Search Report—PCT/US08/053338, International Search Authority—European Patent Office-Jul. 1, 2008.
Written Opinion—PCT/US08/053338, International Search Authority—European Patent Office-Jul. 1, 2008.
Taiwan Search Report—TW097104973—TIPO—Mar. 10, 2012.

* cited by examiner

*Primary Examiner* — Jasmine Song
*Assistant Examiner* — Daniel Bernard
(74) *Attorney, Agent, or Firm* — Nicholas J. Pauley; Peter M. Kamarchik; Jonathan T. Velasco

(57) ABSTRACT

Address translation performance within a processor is improved by identifying an address that causes a boundary crossing between different pages in memory and linking address translation information associated with both memory pages. According to one embodiment of a processor, the processor comprises circuitry configured to recognize an access to a memory region crossing a page boundary between first and second memory pages. The circuitry is also configured to link address translation information associated with the first and second memory pages. Thus, responsive to a subsequent access the same memory region, the address translation information associated with the first and second memory pages is retrievable based on a single address translation.

26 Claims, 5 Drawing Sheets

ADDRESS TRANSLATION METHOD AND APPARATUS

BACKGROUND

1. Field of the Invention

The present invention generally relates to address translation, and particularly relates to translating virtual addresses that create memory page boundary crossing conditions.

2. Relevant Background

Virtual memory is a memory management technique whereby possibly non-contiguous physical memory (physical address space) is presented to a process (software) as contiguous memory (virtual address space). Even though allocated physical memory is not always sequentially organized (or even in the same media, e.g., SDRAM and ROM), processes view memory as a linear sequence because they deal with a contiguous virtual address space. Further, programs are not usually aware of how physical memory is allocated. Instead, a processor or other device conventionally manages virtual memory allocation.

Memory management divides physical memory into pages (or segments) and provides a mapping of virtual addresses onto the actual physical memory pages which is transparent to processes accessing the memory. Processes view only the virtual address space while the physical address space is where corresponding data actually reside in memory. A processor conventionally maps the virtual address space onto a physical address space using address translation. Address translation involves looking up a physical address based on a given virtual address. A virtual address is conventionally divided into at least two parts—a virtual page number and a page offset. The virtual page number identifies a particular page of virtual memory. The page offset identifies a desired region (or block) within the page.

A page table maintained in main memory conventionally stores a list of virtual page numbers and corresponding physical page numbers. The page table is searched using the virtual page number portion of a virtual address. If a virtual page number matches an entry in the page table, the corresponding physical page number is retrieved from the table. Otherwise, a page table error occurs. The retrieved physical page number, along with the page offset, forms a physical address used to retrieve information from memory. The page number identifies the proper page of physical memory. The desired memory region within the page is then accessed using the page offset.

To improve performance, frequently accessed page table entries are stored locally to a processor, e.g., in a Translation Lookaside Buffer (TLB). TLBs may support a single level of local cache memory or multiple cache levels, e.g., level one instruction and data caches and a level two cache. In any event, a TLB performs address translation much the same way as a page table does. If a match occurs during a TLB lookup using a virtual page number, the corresponding physical page number is retrieved from the TLB and provided, with the page offset, to a physically-tagged cache. If the physical address hits in the cache, the cache line corresponding to the physical address is retrieved from the cache. Otherwise, a higher level cache lookup may occur.

Virtual memory enables programs to execute without requiring their entire address space to be resident in physical memory. Thus, programs can be executed using less physical memory than actually needed. In addition, virtual memory isolates programs from each other because each program's virtual address space can be independently mapped to one or more pages of physical memory allocated exclusively to that program. Also, application programs are simplified in that they are not responsible for memory management. However, certain types of memory accesses require additional address translation processing to complete successfully.

For example, when a misaligned memory access occurs, the desired word is located partly in one memory row and partly in another. If the two rows are allocated to different memory pages, a page boundary crossing occurs. An instruction that references a region in memory crossing a boundary between two memory pages is conventionally replicated and executed in two parts. A first page piece of the replicated instruction completes execution based on a physical address associated with the first memory page and a second page piece of the replicated instruction completes execution based on an address associated with the second memory page. Thus, the different memory pages are accessed separately by replicating the instruction.

Multiple address translations are conventionally required to obtain the physical memory addresses associated with the different memory pages. A first address translation is performed to retrieve the physical address associated with the first memory page and a second address translation is performed to retrieve the physical address associated with the second memory page. The additional address translation processing required for an instruction that creates a boundary crossing condition reduces processor performance and increases power consumption, particularly if access to a page table maintained in main memory is needed.

SUMMARY OF THE DISCLOSURE

According to the methods and apparatus taught herein, address translation performance within a processor is improved by identifying virtual or physical addresses that cause boundary crossings between different pages in memory. That is, an instruction is identified if it will cause a misaligned memory access that also crosses a page boundary. When such a condition is recognized, address translation information associated with both memory pages is linked together and stored within the processor. The address translation information associated with both pages may be obtained using a single address translation responsive to the same page-crossing region in memory being subsequently accessed. Thus, multiple address translations are avoided.

According to one embodiment of a processor, the processor comprises circuitry configured to recognize an access to a region in memory crossing a page boundary between first and second memory pages. The circuitry is also configured to link address translation information associated with the first and second memory pages. Thus, responsive to a subsequent access to the same memory region, the address translation information associated with the first and second memory pages is retrievable based on a single address translation.

When the same region in memory is subsequently accessed, the processor circuitry recognizes the corresponding instruction and translates a virtual address presented by the instruction into a physical address associated with the first memory page. The circuitry retrieves a physical address associated with the second memory page based on previously established information linking the virtual address to the physical address associated with the second memory page. Thus, address translation information associated with the first and second memory pages is retrieved based on a single address translation.

Of course, the present invention is not limited to the above features and advantages. Those skilled in the art will recog-

DETAILED DESCRIPTION

Figure 1:
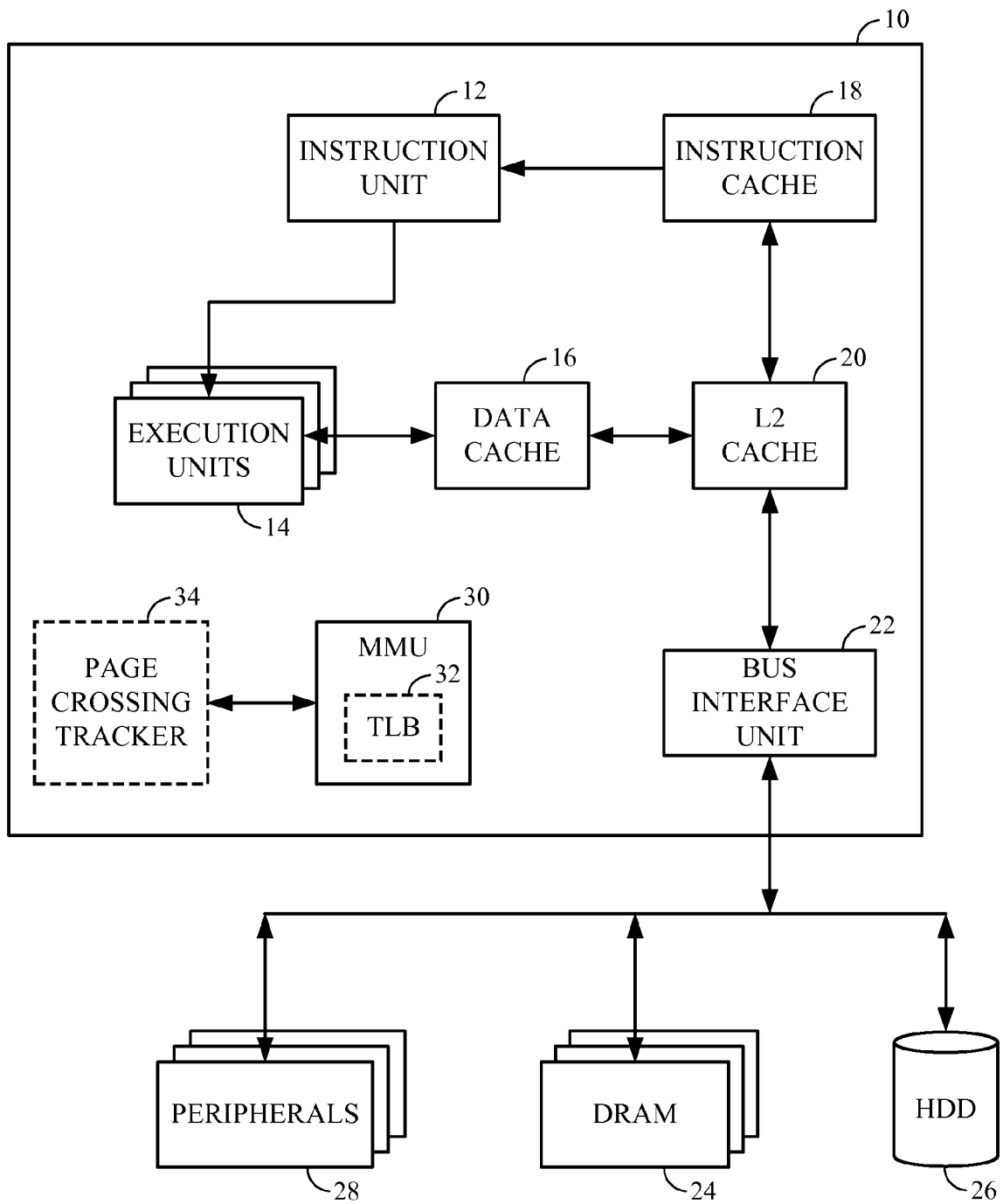
FIG. 1 is a block diagram illustrating an embodiment of a processor having circuitry for tracking page boundary crossings during address translation.

FIG. 1 illustrates an embodiment of a processor 10 including an instruction unit 12, execution units 14, data and instruction caches 16 and 18, a second-level cache 20 and a bus interface unit 22. The instruction unit 12 provides centralized control of instruction flow to the execution units 14. The execution units 14 execute instructions dispatched by the instruction unit 12, including loading and storing information in the data cache 16. The data and instruction caches 16 and 18 store data and instructions, respectively. The L2 cache 20 provides a high-speed memory buffer between the data and instruction caches 16 and 18 and main memory external to the processor such as DRAM 24 and/or one or more hard-disk-drives (HDDs) 26. The bus interface unit 22 provides a mechanism for transferring data, instructions, addresses, and control signals between the processor 10 and devices external to the processor such as peripherals 28 and main memory.

Main memory is represented as virtual memory to processes running on the processor 10. That is, pages of main memory are allocated as virtual memory for use by processes during program execution. Memory management divides physical memory into pages and provides a mapping of virtual addresses onto the physical memory pages that is transparent to processes accessing the memory. A page table (not shown) is maintained in main memory for enabling mapping between virtual and physical memory addresses. A Memory Management Unit (MMU) 30 or similar device included in the processor 10 maintains frequently or recently referenced page table entries local to the processor 10 for improving address translation performance.

To this end, a Translation Lookaside Buffer (TLB) 32 included in or associated with the MMU 30 stores the most frequently or recently accessed page table entries. Address translation is performed locally within the processor 10 by the TLB 32. If a TLB entry matches a given virtual page number, the corresponding physical page number is provided by the TLB 32. Otherwise, higher-level address translation is performed, usually by operating system software, via page tables maintained in main memory. A page crossing tracker 34 included in or associated with the MMU 30 improves address translation performance by reducing the number of address translations performed to accommodate a misaligned memory access that crosses a memory page boundary.

The page crossing tracker 34 stores address translation information associated with one or more virtual or physical addresses that create a page boundary crossing condition. That is, if an instruction executed by the processor 10 references a memory region crossing a boundary between two physical memory pages, the page crossing tracker 34 stores address translation information associated with the second memory page, e.g., a physical address or page number identifying the second memory page and a link to the virtual address. This way, if a subsequent instruction references the same address, the page crossing tracker 34 is able to recognize the address and provide the corresponding physical address information. Accordingly, the TLB 32 performs only one address translation to retrieve the physical page number associated with the first memory page. The physical page number associated with the second memory page is non-translationally retrieved from the page crossing tracker 34. That is, the physical page number associated with the second memory page is retrieved from the page crossing tracker 34 instead of having to perform a second address translation. The instruction is replicated and executed in two parts based on the respective physical addresses. The instruction may be replicated multiple times if the instruction causes several cache lines to be crossed in one of the caches 16, 18, 22.

Figure 2:
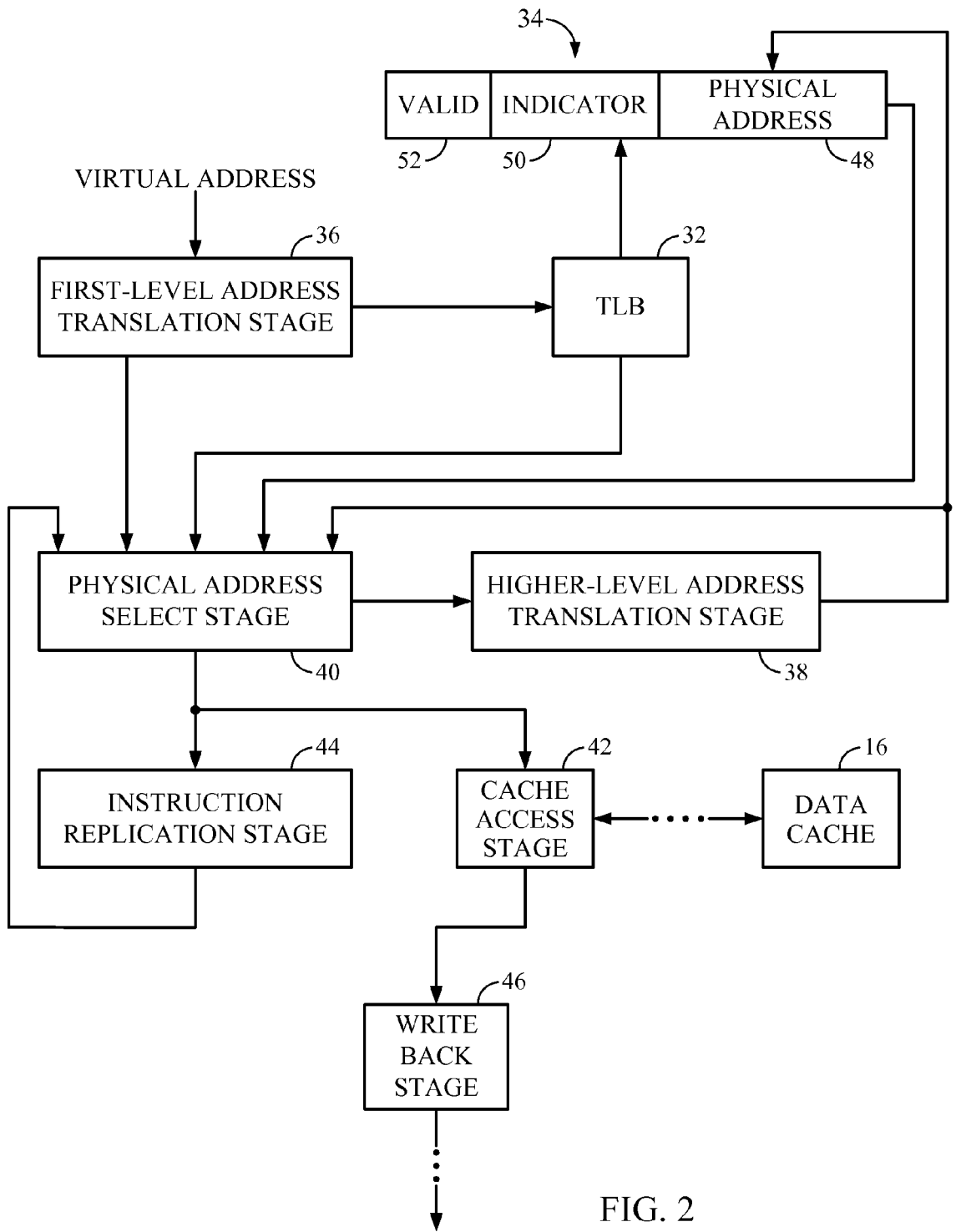
FIG. 2 is a block diagram illustrating one embodiment of the page crossing tracking circuitry of FIG. 1.

FIG. 2 illustrates one embodiment of the page crossing tracker 34 and several stages of a load-store unit (i.e., one of the execution units 14) included in the processor 10. According to this embodiment, the page crossing tracker 34 comprises a register for storing address translation information associated with an address that creates a page boundary crossing condition. Alternatively, the page crossing tracker 34 may be a table having multiple entries. Either way, the page crossing tracker 34 reduces address translation processing by storing address translation information associated with at least one virtual or physical address that causes a page boundary crossing.

Operation of the page crossing tracker 34 is next described with reference to the program logic of FIG. 3 and a virtual address presented by an instruction that does not initially match any entries in the TLB 32. As such, higher level address translation is performed to obtain the physical address corresponding to the virtual address. In more detail, the virtual address may comprise a virtual page number and an offset. The virtual page number identifies a particular virtual memory page while the page offset identifies a location within the page. Because no matching TLB entry initially exists in this example, a first-level address translation stage 36 indicates higher-level address translation is needed, e.g., as illustrated by Block 100 of FIG. 3. A higher-level address translation stage 38 requests translation of the virtual address, e.g., by accessing a higher-level TLB (not shown) included in the processor 10 or the page table maintained in main memory. Either way, a physical address associated with the virtual address is eventually obtained.

Figure 3:
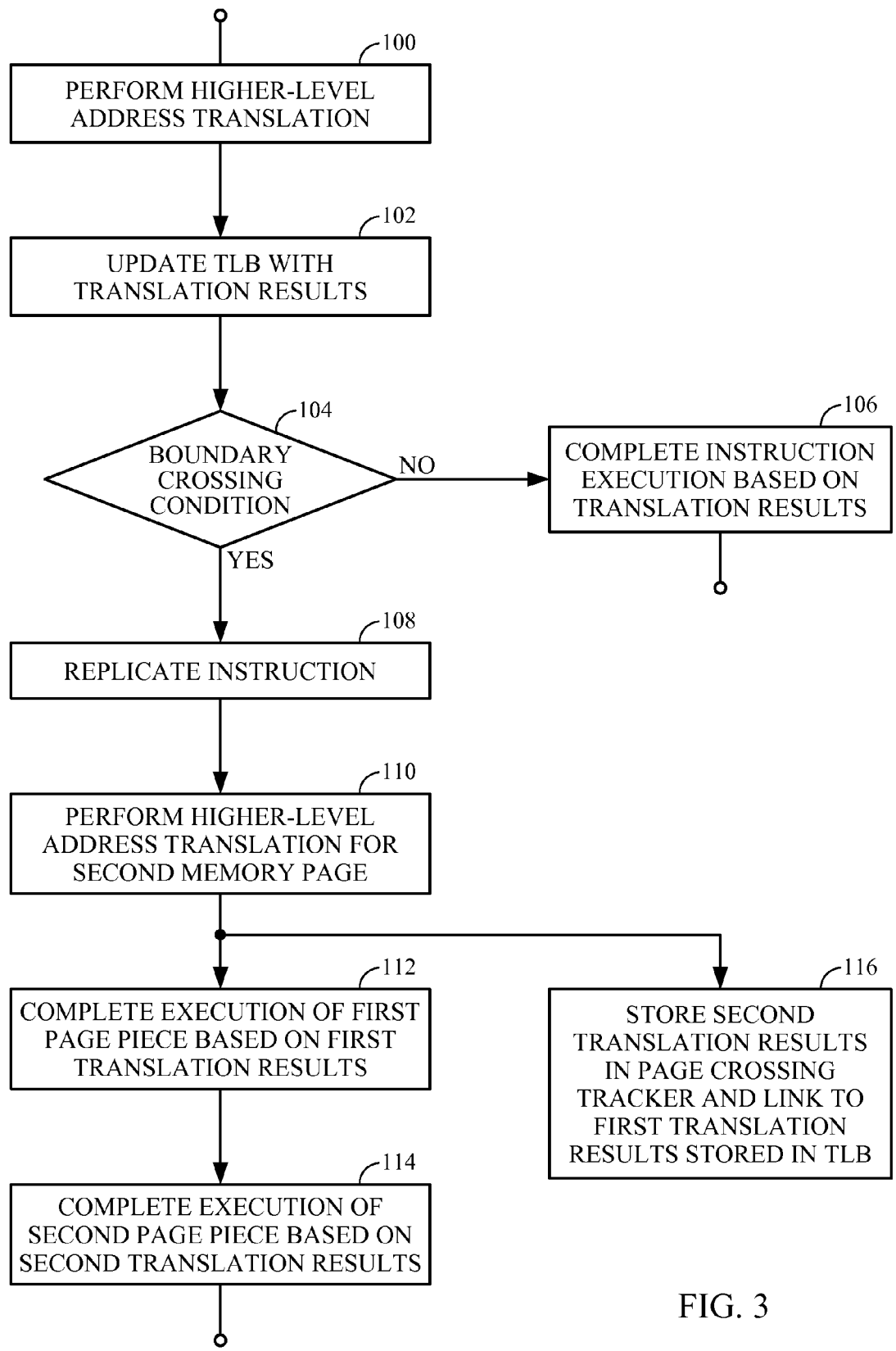
FIG. 3 is a logic flow diagram illustrating an embodiment of program logic for storing address translation information in the page crossing tracking circuitry of FIG. 1.

The address translation information is stored in a TLB entry, e.g., as illustrated by Block 102 of FIG. 3. This way, the address translation information is more readily available in the event the same virtual address is subsequently requested. In one embodiment, a physical address select stage 40 such as multiplexer circuitry or any other stage at which the virtual address is known also determines whether the virtual address translates to a physical memory region that crosses a boundary between two pages, e.g., as illustrated by Block 104 of FIG. 3. For example, the page offset portion of the virtual address is compared with the memory page size settings to determine whether a page boundary crossing will occur. If the address translates to a memory region located within a single page of memory, instruction execution is completed based on the translated physical address, e.g., as illustrated by Block 106 of FIG. 3. For example, a cache access stage 42 determines whether the data cache 16 or L2 cache 20 contains the line tagged by the physical address, and if not, retrieves it from external memory.

However, if the virtual address references a memory region spanning multiple memory pages, an instruction replication stage 44 replicates the instruction, e.g., as illustrated by Block 108 of FIG. 3. For example, if the address references a quadword having four bytes located in one physical memory page and four bytes located in another page, the previously translated physical address is used to retrieve the four bytes residing in the first memory page. To retrieve the four bytes located in the second memory page, a physical address identifying the second page is obtained by the higher-level address translation stage 38, e.g., as illustrated by Block 110 of FIG. 3. The first page piece of the replicated instruction completes execution based on the physical address identifying the first memory page, e.g., as illustrated by Block 112 of FIG. 3. The second page piece of the replicated instruction completes execution based on the physical address identifying the second memory page, e.g., as illustrated by Block 114 of FIG. 3. A write back stage 46 ensures proper storage of instruction execution results.

Because a page boundary crossing was detected, the address translation information obtained for the second memory page is stored for subsequent use. However, instead of storing the information in a different TLB entry, it is stored in a physical address field 48 of the page crossing tracker 34, e.g., as illustrated by Block 116 of FIG. 3. In addition, an indicator value is stored in an indicator field 50. The indicator value links the page crossing tracker entry containing the second page's address translation information to the TLB entry containing the first page's address translation information.

In one embodiment, the indicator field 50 stores the index value of the TLB entry containing the address translation information associated with the first memory page. In another embodiment, the indicator field 50 stores the physical address or page number associated with the first memory page. In yet another embodiment, the indicator field 50 stores the virtual address that creates the boundary crossing condition. Those of skill in the art will readily recognize that a broad variety of values could be stored in the indicator field 50 to link the physical address information 48 with the TLB entry associated with the first memory page. Further, the instruction replication stage 44 may identify page boundary crossings instead of the physical address select stage 40, e.g., by identifying physical addresses that cause page boundary crossings. Regardless, if the same region in memory is subsequently accessed, the page crossing tracker 34 recognizes the boundary crossing condition by examining the indicator field 50. In response, the tracker 34 provides address translation information associated with the second page.

Operation of the page crossing tracker 34 is described next with reference to the program logic of FIG. 4 and a subsequent instruction that presents the same virtual address that caused the boundary crossing condition previously discussed. Because the TLB 32 contains a matching entry in this example, the physical address or page number associated with the virtual address is provided by the TLB 32, e.g., as illustrated by Block 200 of FIG. 4. The physical address select stage 40 determines whether the virtual address references a region in memory that crosses a page boundary, e.g., as illustrated by Block 202 of FIG. 4. Alternatively, the instruction replication stage 44 determines whether the corresponding physical address causes a page boundary crossing condition. Regardless, if a boundary crossing condition is not detected, the instruction completes execution based on the physical address information provided by the TLB 32, e.g., as illustrated by Block 204 of FIG. 4.

However, in the present example, the virtual address is known to cause a page boundary crossing between first and second memory pages. Thus, the instruction is replicated as previously described, e.g., as illustrated by Block 206 of FIG. 4. Further, the indicator field 50 of the page crossing tracker 34 is examined to determine whether a link has been formed with the virtual address. In one embodiment, the matching TLB entry index is compared to one or more values stored in the indicator field 50. In another embodiment, the virtual address or corresponding physical address (or page number) provided by the TLB 32 is compared to one or more address values stored in the indicator field 50.

Regardless, the information stored in the indicator field 50 indicates whether the tracker 34 contains the desired physical address information. Unless a valid field 52 indicates the entry is invalid, the physical address information associated with the second page is retrieved from the page crossing tracker 34, e.g., as illustrated by Block 208 of FIG. 4. The valid field 52 indicates invalidity when the corresponding entry in the TLB is invalidated.

Figure 4:
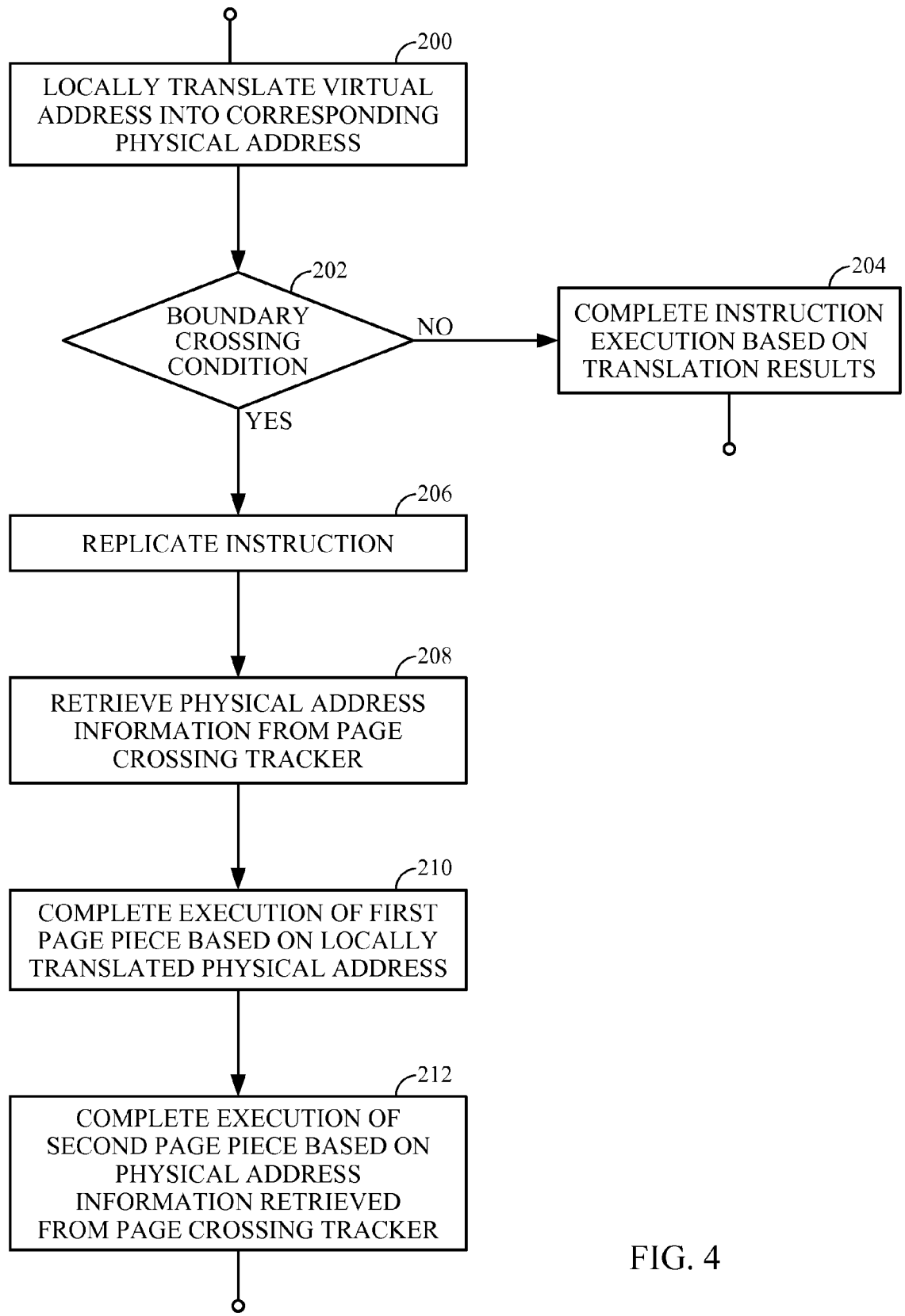
FIG. 4 is a logic flow diagram illustrating an embodiment of program logic for retrieving address translation information from the page crossing tracking circuitry of FIG. 1.

A first page piece of the replicated instruction completes execution based on the physical address identifying the first memory page as provided by the TLB 32, e.g., as illustrated by Block 210 of FIG. 4. A second page piece of the replicated instruction completes execution based on the physical address identifying the second memory page as retrieved from the page crossing tracker 34, e.g., as illustrated by Block 212 of FIG. 4. Circuitry (not shown) prevents a subsequent address translation from occurring when the page crossing tracker 34 contains address translation information for the second page. Thus, only a single address translation is performed when the page crossing tracker 34 recognizes a page boundary crossing condition.

Figure 5:
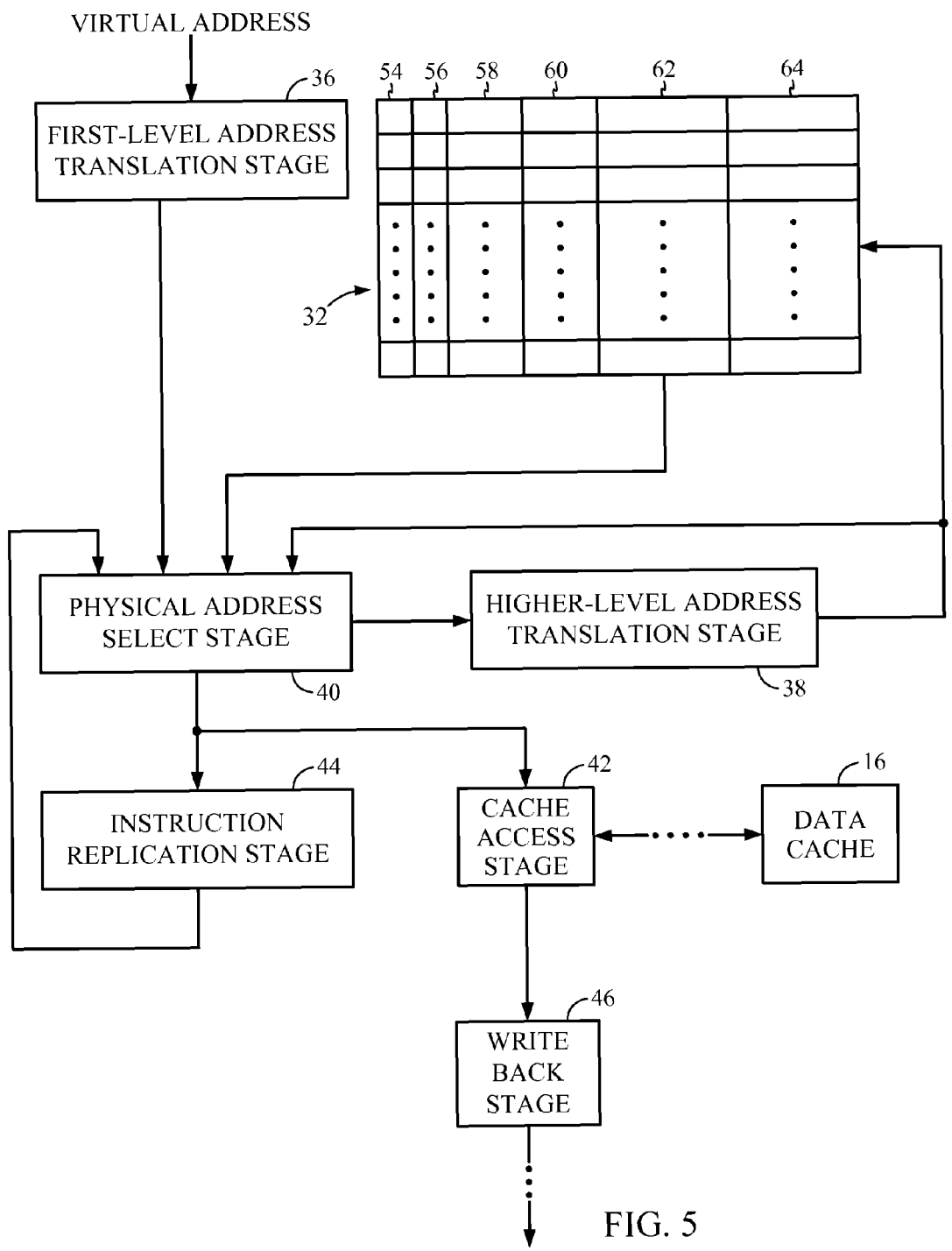
FIG. 5 is a block diagram illustrating another embodiment of the page crossing tracking circuitry of FIG. 1.

FIG. 5 illustrates another embodiment of the page crossing tracker 34. According to this embodiment, the tracker 34 is implemented as part of the TLB 32. Each entry in the TLB 32 has a valid field 54, indicator field 56, index 58, tag field 60 and two physical address fields 62 and 64. The tag field 60 stores the virtual address (or page number) of those virtual addresses whose physical address information is maintained by the TLB 32. As such, the tag field 60 is searched during a TLB access to determine whether a record matching a given virtual address is stored in the TLB 32.

The first physical address field 62 contains physical address information such as the complete address or physical page number corresponding to each virtual address having a record maintained by the TLB 32. If a particular virtual address is known to cause a boundary crossing between two memory pages, then the second physical address field 64 contains physical address information associated with the second memory page. The indicator field 56 contains one or more bits linking the two physical address fields 62 and 64 when the corresponding TLB entry is associated with a virtual address that creates a boundary crossing condition.

Operation of the page crossing tracker 34 implemented as part of the TLB 32 is next described with reference to a virtual address presented by an instruction that does not initially match any entries in the TLB 32. A higher-level address translation is performed to obtain the physical address corresponding to the virtual address, e.g., as illustrated by Block 100 of FIG. 3. The physical address field 62 in the corresponding TLB entry is updated with the translation results, e.g., as illustrated by Block 102 of FIG. 3. If the physical address select stage 40 determines the virtual address will cause a boundary crossing between two memory pages during memory access, a second higher-level address translation is performed. Alternatively, the instruction replication stage 44 may detect the page boundary crossing condition based on the corresponding physical address. Regardless, the physical address identifying the second memory page is obtained during the second higher-level address translation, e.g., as illustrated by Block 110 of FIG. 3. This way, physical address information for both pages is available for completing instruction execution.

The instruction is replicated and execution is completed using the two physical memory addresses as previously described, e.g., as illustrated by Blocks 108, 112 and 114 of FIG. 3. In addition, the physical address information associated with the second memory page is stored in the same TLB entry containing the physical address information associated with the first page, e.g., as illustrated by Block 116 of FIG. 3. That is, in the same TLB entry, physical address information associated with the first page is stored in first address field 62 and physical address information associated with the second page is stored in second address field 64. The indicator field 56 in the TLB entry is set to indicate the two physical addresses are linked and associated with a virtual address that creates a page boundary crossing condition. This way, if a subsequent instruction references the same virtual or physical address, only a single address translation is needed to obtain the physical address information associated with the first and second memory pages.

Operation of the page crossing tracker 34 implemented as part of the TLB 32 is next described with reference to a subsequent instruction accessing the same virtual address that created the boundary crossing condition previously described. When the TLB 32 is accessed, a matching entry is identified by comparing the virtual address to the tag values stored in the TLB 32, e.g., as illustrated by Block 200 of FIG. 4. In the present example, the virtual address is known to cause a page boundary crossing between first and second memory pages. Thus, the instruction is replicated as previously described, e.g., as illustrated by Block 206 of FIG. 4. Further, the first address field 62 of the matching TLB entry provides the physical address information associated with the first memory page. Execution of a first page piece of the replicated instruction completes based on the physical address information obtained from the first address field 62, e.g., as illustrated by Block 210 of FIG. 4.

In addition, the indicator field 56 in the matching TLB entry indicates that the first and second physical address fields 62 and 64 are linked. Accordingly, the physical address information stored in the second address field 64 is retrieved, e.g., as illustrated by Block 208 of FIG. 4. The physical address information retrieved from the second address field 64 identifies the second memory page. Execution of a second page piece of the replicated instruction completes based on the physical address information obtained from the second address field 64, e.g., as illustrated by Block 212 of FIG. 4. This way, only a single address translation is performed during execution of the subsequent instruction.

If the valid field 54 indicates the TLB entry is invalid, address translation is not performed and the higher-level address translation stage 38 obtains the necessary physical addresses as previously described, e.g., as illustrated by Blocks 100 and 110 of FIG. 3. Further, the indicator field 56 may also indicate the link between two memory pages is invalid responsive to an architected register that affects address translation being updated or a TLB entry being overwritten. When an invalid page crossing link is encountered, the address translation information associated with the linked page is not used. Instead, a subsequent address translation is performed.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method comprising:
receiving a first submission of a virtual address of data at a first level address translation stage, the data being stored in a physical memory, the data having a first data portion and a second data portion, the first data portion being stored at a first physical address in a first page in the physical memory, the second data portion being stored at a second physical address in a second page in the physical memory, the virtual address of the data corresponding to the first physical address and the second physical address;
retrieving the first physical address at the first level address translation stage;
providing the first physical address;
accessing a second level address translation stage to retrieve the second physical address;
providing the second physical address;
storing the second physical address in a register;
creating a link between linking the second physical address and the first physical address;
receiving a second submission of the virtual address of the data at the first level address translation stage;
retrieving the first physical address at the first level address translation stage; and
retrieving, at the first level address translation stage, the second physical address from the register, using the link between the second physical address and the first physical address.

2. The method of claim 1, further comprising storing address translation information of the first data portion at a translation lookaside buffer (TLB), wherein the address translation information comprises the virtual address and the first physical address.

3. The method of claim 2, wherein the register is accessible to the TLB.

4. The method of claim 1, further comprising replicating an instruction associated with the virtual address by retrieving the first data portion and the second data portion.

5. The method of claim 3, wherein linking the second physical address to the first physical address comprises associating address translation information of the second data portion with address translation information of the first data portion by storing an indicator value at an indicator field of a page crossing tracker; wherein the indicator field is associated with the second data portion.

6. The method of claim 5, wherein the indicator value comprises an index value of a TLB entry, wherein the TLB entry includes the address translation information of the first data portion.

7. The method claim 5, wherein the indicator value comprises the first physical address.

8. The method of claim 1, further comprising breaking the link established in response to the first submission, wherein breaking the link comprises invalidating information linking physical address information associated with the second page to virtual address information associated with the first page.

9. The method of claim 8, wherein the link is broken in response to a translation lookaside buffer (TLB) entry being overwritten.

10. A processor configured to:
receive a first submission of a virtual address of data at a first level address translation stage, the data being stored in a physical memory, the data having a first data portion and a second data portion, the first data portion being stored at a first physical address in a first page in the physical memory, the second data portion being stored at a second physical address in a second page in the physical memory, the virtual address of the data corresponding to the first physical address and the second physical address;
retrieve the first physical address at the first level address translation stage;
provide the first physical address;
access a second level address translation stage to retrieve the second physical address;
provide the second physical address;
store the second physical address in a page crossing tracker table that contains more than one entry;
create a link between the second physical address and the first physical address;
receive a second submission of the virtual address of the data at the first level address translation stage;
retrieve the first physical address at the first level address translation stage; and
retrieve, at the first level address translation stage, the second physical address from the page crossing tracker table, using the linking between the second physical address and the first physical address.

11. The method of claim 5, wherein the indicator value comprises the virtual address of the data.

12. The method of claim 5, wherein the indicator value comprises a first page number associated with the first page.

13. The processor of claim 10, wherein the processor is further configured to replicate an instruction associated with the virtual address by retrieving the first data portion and the second data portion.

14. The processor of claim 10, wherein the processor is further configured to store virtual address information and physical address information associated with the first page in a translation lookaside buffer entry.

15. The processor of claim 14, wherein the processor is further configured to store physical address information associated with the second page and information identifying the translation lookaside buffer entry.

16. The processor of claim 10, wherein the processor is further configured to replicate an instruction by retrieving the first data portion using the first physical address and retrieving the second data portion using the second physical address.

17. The processor of claim 16, wherein the processor is further configured to execute the replicated instruction.

18. The processor of claim 17, wherein the processor is further configured to store instruction execution results of the replicated instruction.

19. The processor of claim 13, wherein the processor is further configured to execute the replicated instruction.

20. The processor of claim 19, wherein the processor is further configured to store instruction execution results of the replicated instruction.

21. A method comprising:
determining that a virtual address associated with an instruction corresponds to a memory region of a memory, the memory region spanning a page boundary between a first memory page and a second memory page;
translating the virtual address into a first physical address associated with the first memory page by identifying a translation lookaside buffer (TLB) entry in a TLB, wherein the TLB entry corresponds to the virtual address and has a first physical address field to store the first physical address and a second physical address field to store a second physical address associated with the second memory page; and
retrieving, via an access to a first level address translation stage, the second physical address from the second physical address field of the TLB entry when the TLB entry includes an indication of a link between the first physical address and the second physical address.

22. The method of claim 21, further comprising replicating the instruction, wherein the replicated instruction completes execution based on the first physical address and based on the second physical address.

23. A method comprising:
receiving a first submission of a virtual address;
in response to the first submission, accessing a first register to determine whether information associated with the virtual address is stored at the first register; and
in response to determining that the information associated with the virtual address is not stored at the first register:
identifying a first physical address associated with the virtual address, the first physical address being associated with a first memory page;
storing the first physical address in a first entry at the first register, the first entry at the first register including first information associated with the first physical address;
determining whether the virtual address is associated with a region of a memory that crosses a page boundary; and
in response to determining that the virtual address is associated with the region of the memory that crosses the page boundary:
identifying a second physical address associated with the virtual address, the second physical address being associated with a second memory page; and
storing the second physical address in a second entry at a second register, wherein the second entry at the second register includes second information associated with the second physical address, and wherein the second information includes an indicator value that provides a link to the first entry at the first register.

24. The method of claim 23, further comprising:
receiving a second submission of the virtual address;
in response to the second submission, accessing the first register to determine whether the first information is stored at the first register; and
in response to determining that the first information is stored at the first register:
retrieving the first at the first register; and
in response to determining that the virtual address is associated with the region of the memory that crosses the page boundary, retrieving the second entry stored at the second register based at least in part on the indicator value.

25. The method of claim 23, further comprising:

executing an instruction associated with the virtual address based on the first entry at the first register;

replicating the instruction to produce a replicated instruction; and executing the replicated instruction based on the second entry at the second register.

26. The method of claim 23, further comprising altering the indicator value by invalidating indicator value data that identifies the first information.

* * * * *